March 25, 1930.  H. L. WOOLFENDEN  1,751,965
BUILDING STRUCTURE
Filed June 16, 1928  2 Sheets-Sheet 1

INVENTOR.
HENRY L. WOOLFENDEN
BY *Jking Harness*
ATTORNEY.

March 25, 1930.                H. L. WOOLFENDEN                1,751,965
                                BUILDING STRUCTURE
                              Filed June 16, 1928        2 Sheets-Sheet 2

INVENTOR.
HENRY L. WOOLFENDEN
BY
ATTORNEY.

Patented Mar. 25, 1930

1,751,965

UNITED STATES PATENT OFFICE

HENRY L. WOOLFENDEN, OF DETROIT, MICHIGAN

BUILDING STRUCTURE

Application filed June 16, 1928. Serial No. 285,815.

This invention relates to building structures and particularly to such structures as are adapted for use in connection with the washing of, or other operations on motor vehicles, the principal object being to provide a new and improved construction particularly adapted for the illumination of the lower portion of such motor vehicles while work is being performed thereon.

Another object is to provide a wash rack for motor vehicles, the side walls of which are formed to include illuminating means disposed in a position whereby to illuminate the chassis of such vehicles.

Another object is to provide a wash rack for motor vehicles including side walls formed at their point of junction with the cooperating floor to provide a chamber for the reception of illuminating means for illuminating the chassis of vehicles positioned in such rack, such recess being closed by a water tight cover to prevent entrance of water to the illuminating means.

A further object is to provide a wash rack or the like for motor vehicles in which the side walls are provided with an angularly disposed face adjacent their point of junction with the floor, recesses being provided in the faces in which illuminating means are positioned and protected against moisture by a water tight transparent cover, means being provided in the wall in conjunction with the recesses for draining any condensed moisture that may be present in the recesses and for permitting a circulation of air through the recesses.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views,—

Figure 1:
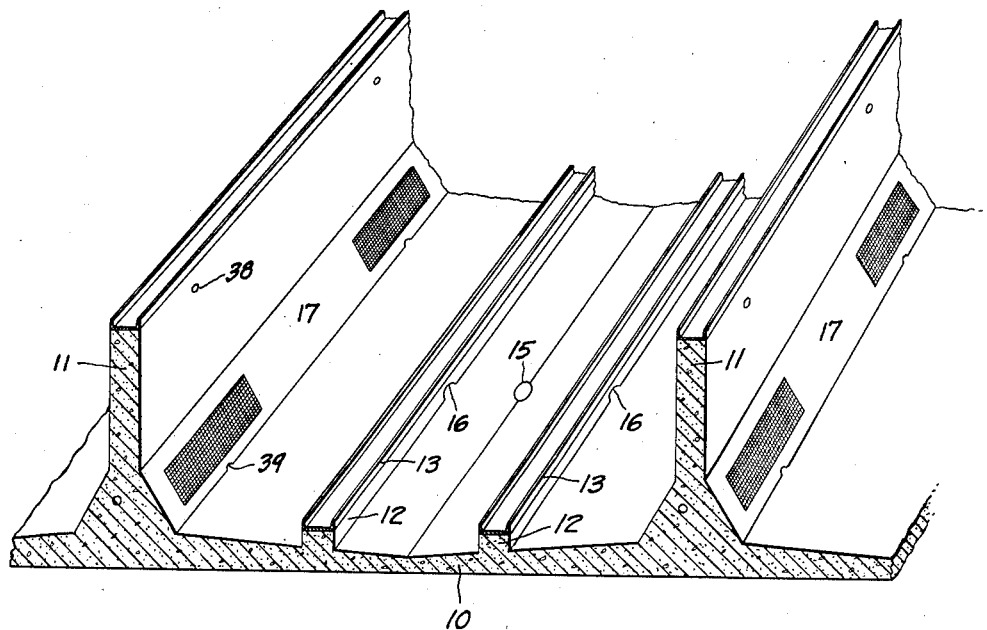
Fig. 1 is a fragmentary broken perspective view of a vehicle wash rack constructed in accordance with the present invention.

In the washing of motor vehicles by utilizing wash racks as is the conventional practice followed at the present time, much difficulty is experienced in properly illuminating the chassis and other parts of the motor vehicle positioned below the fenders, during the washing operation. The method usually employed is to use extension cords with a guarded light bulb on the end of the same, which bulbs are simply laid on the floor or else held by hand while the chassis is being washed. Due to the position of such lamps the bulb is frequently broken, and due to the ever presence of moisture the apparatus is subject to deterioration and the operators are often subjected to electrical shocks which are liable to be more or less dangerous. Furthermore, by the use of such extension cords and bulbs, the usual result is insufficient illumination of the parts to be cleaned with resulting poor quality of the work accomplished.

By the use of the present invention I provide a wash rack or like construction wherein special means are provided for supplying ample illumination of the chassis of the vehicle during the washing operation thereon, such means including illuminating means built into the wall of the wash rack and so constructed as to be protected against the effects of moisture or disturbance, and constructed to be adjusted to direct the light therefrom on the chassis parts.

In accordance with the present invention I show in the accompanying drawing a wash rack having a floor 10 and spaced side walls 11, the side walls 11 extending upwardly preferably at least to a height substantially equal to the height of the vehicles to be washed. The floor 10 may be provided with a pair of spaced upwardly extending supporting portions 12, each adapted to support an upwardly opening channel 13 which serves as tracks for the wheels of vehicles to be washed. The floor 10 is preferably inclined towards the center and there provided with a drain 15 for carrying away the water, cross passages 16 being preferably formed in the supports 12 to permit the passage of water therethrough. Two or more wash racks may be formed in parallel, so that a single wall 11 may be common to two wash racks, and such a condition is assumed to exist in the embodiment shown in the drawings.

Figure 3:
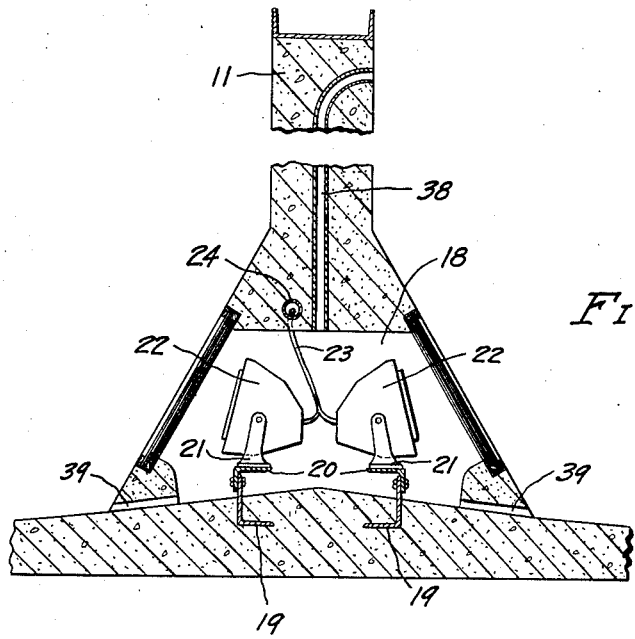
Fig. 3 is an enlarged broken vertical section taken through one of the vertical walls shown in Figs. 1 and 2 at a point where one of the illuminating recesses are provided therein.

In accordance with the present invention the lower portions of the walls 11 on each side thereof adjacent their point of junction to the floor 10 are formed to provide angularly extending faces 17, and at intervals openings or recesses 18 are provided extending through the wall 11 between the faces 17, although where a wall is not common to two wash racks the openings preferably do not extend completely through the wall as will be apparent. Such walls 11 are preferably formed of concrete and the openings or recesses 18 formed therein during the original fabrication of the walls, and as indicated in Fig. 3, angular supporting members 19 are preferably cast into the concrete at the bottom of each opening or recess 18. To each of the angle members 19 I secure an angle member 20 which serves as a support for the bases 21 of the lamp units 22. The lamp units 22 may be of any conventional design but preferably of the reflector type and adjustable on their bases 21, so that they may be adjusted to direct the light therefrom at an angle most advantageous for the illumination of the lower portion of a motor vehicle on the tracks 13. Electric cables 23 for supplying current to the lamps 22 may be passed through conduits 24 cast in the walls 11 during the fabrication of the same.

Figure 4:
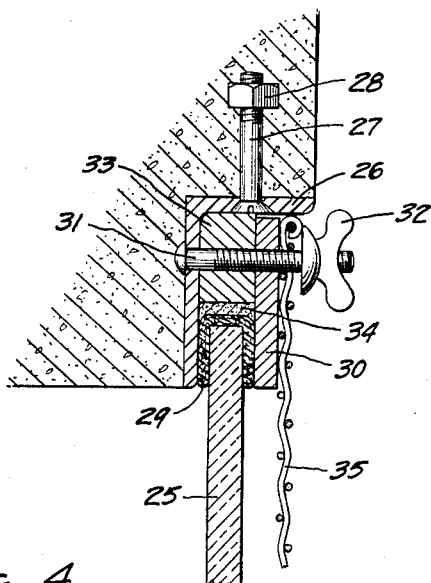
Fig. 4 is an enlarged fragmentary view showing the means of sealing an illuminating recess against the entrance of water.

In order to protect the lamps 22 from the water and moisture always present in such wash racks I provide a transparent cover 25 for each side of the recesses 18, which cover is made water tight. Although the method of securing such cover 25 in place and making a water tight connection between it and the surrounding edge of the opening may assume various forms, one method which may be followed is indicated in Fig. 4.

As indicated in that figure, an angle sectioned frame member 26 provided with anchoring means such as bolts 27 and cooperating nut 28 is secured to the wall 11 around the outer edges of each opening or recess 18. The cover 25 which is preferably of glass is of sufficient size to overlap the inner edges of the angle frame member 26 and is preferably provided with a resilient channel member 29 enveloping its edges. A clamping plate 30 overlying the outer face of the resilient member 29 is adapted to clamp the protected edges of the cover 25 between it and the inner face of the angle frame member 26, the plate 30 being drawn up in place by bolts 31 and wing nuts 32. Blocks 33 may be provided, if desired, to prevent an excessive pressure being applied to the edges of the cover 25. Furthermore, water-proof material such as 34 may be provided around the outer edges of the cover 25 to further insure against the entrance of moisture or water to the inner side of the cover 25. It is also preferable that some means such as the screen 35 be provided over the cover 25 in order to prevent inadvertent breakage of the same, and such screen may be held in place by the same wing nuts 32 which serves to hold the clamping plate 30 in position.

Figure 2:
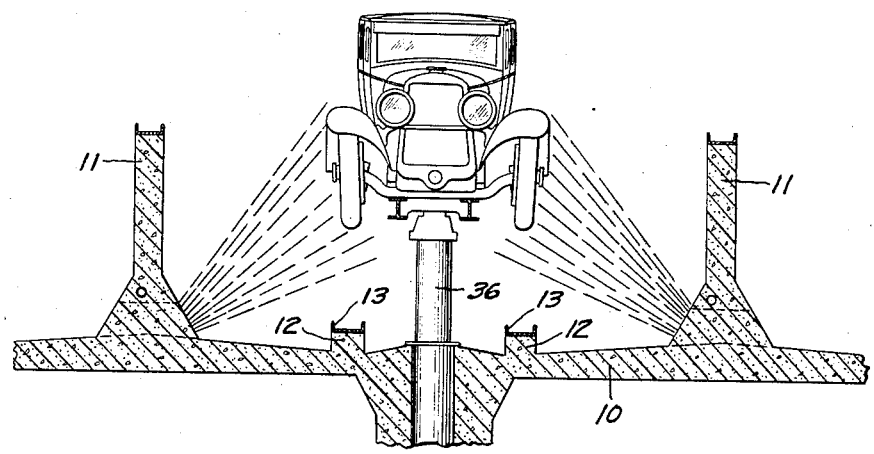
Fig. 2 is a vertical sectional view taken transversely of the wash rack shown in Fig. 1, and illustrating the manner in which the lighting means may be employed to illuminate the chassis of a motor vehicle.

In some instances it is desirable to employ lifting means such as the hydraulic jack 36, indicated in Fig. 2, for lifting the vehicle a desired amount above the channels 13 while the chassis is being washed, and it will be apparent that when such is the case the lamps 22 may be adjusted on their bases so as to direct the light therefrom towards the chassis from the under side thereof, as indicated in Fig. 2, so as to amply illuminate the parts thereof during the washing operation.

Due to the heat of the lamps 22 and to the moisture absorptive nature of the concrete forming the walls 11, moisture would condense and collect within the openings 18 unless some means were provided for preventing such collection and condensation. This is taken care of in the present invention in the following manner: Extending upwardly from the top of each of the openings or recesses 18 within the walls 11 is a duct 38 which terminates on the surface of the walls 11 adjacent the top thereof. Other passages 39 connect the interior of the openings or recesses at their lowest points with the exterior of the wall. These passages not only permit a circulation of air in the openings 18, but the lower passages 39 are formed to permit the drainage of any moisture that may condense in the openings.

It is obvious that various modifications of the construction disclosed are possible, and formal changes may be made in the specific embodiment of the invention described without departing from the spirit or substance of the broad invention, the scope of which is commensurate with the appended claims.

What I claim is:

1. In a wash rack for automobiles, a pair of vertical walls, a floor extending between said walls and adapted to receive an automobile thereon, and illuminating means built into said walls adjacent their junction with said floor, and reflectors behind said means arranged to direct light therefrom on the chassis of an automobile between said walls.

2. In a wash rack for automobiles, a pair of vertical walls connected by a floor, a lamp receiving recess formed in each of said walls adjacent its junction with said floor, a lamp within each of said recesses, and means for adjustably supporting said lamps whereby to direct the rays therefrom on the chassis of a vehicle received between said walls.

3. In a structure of the class described, in combination, a vertical wall, a floor joined thereto, said wall being provided with a recess adjacent its junction with said floor, illuminating means in said recess, a water tight transparent cover for said recess, a passage way connecting said recess with the exterior of said wall above said recess, and a passageway connecting said recess with the exterior of said wall at a point at least as low as the lowest point of said recess.

4. In a structure of the class described, in combination, a floor, a wall extending vertically therefrom, said wall at its point of junction with said floor being formed to provide an inwardly and upwardly extending face on each side thereof, said wall being provided with an opening extending between said faces, transparent water tight covers for the ends of said opening, and means for adjustably supporting illuminating means within said opening whereby the light from said illuminating means may be directed through both of said covers at a desired angle to said floor.

5. In a wash rack for automobiles, a pair of vertical walls connected by a floor, each of said walls having a lamp receiving recess formed therein adjacent the junction thereof with said floor, a lamp within each of said recesses, reflectors for directing the rays of said lamps, and means for supporting a vehicle between said walls at an elevation above said floor whereby the rays from said lamps are directed on the chassis of a vehicle supported on said means.

6. In a wash rack for automobiles, a pair of vertical walls connected by a floor, each of said walls being provided with a lamp receiving recess formed therein adjacent the junction thereof with said floor, a lamp within each of said recesses, reflectors for directing the rays of said lamps, and means for supporting a vehicle between said walls and for adjusting its elevation with reference to said floor and said lights.

HENRY L. WOOLFENDEN.